United States Patent [19]

Ogawa et al.

[11] Patent Number: 5,187,639
[45] Date of Patent: Feb. 16, 1993

[54] CAPACITOR AND METHOD OF MANUFACTURING THE SAME

[75] Inventors: Kazufumi Ogawa, Hirakata; Mamoru Soga, Osaka; Norihisa Mino, Settu, all of Japan

[73] Assignee: Matsushita Electric Industrial Co., Ltd., Kadoma, Japan

[21] Appl. No.: 897,291

[22] Filed: Jun. 11, 1992

[30] Foreign Application Priority Data

Jun. 14, 1991 [JP] Japan .................. 3-143498

[51] Int. Cl.$^5$ .................. H01G 4/02; H01G 7/00; H01B 3/18
[52] U.S. Cl. .................. 361/323; 29/25.42; 252/573
[58] Field of Search .............. 29/25.42; 361/317, 323, 361/523–526; 252/573

[56] References Cited

U.S. PATENT DOCUMENTS 5,103,371 4/1992 Ogawa et al. .................. 361/323

Primary Examiner—Donald A. Griffin
Attorney, Agent, or Firm—Fish & Richardson

[57] ABSTRACT

A monomolecularfilm which can be used as a dielectric film is obtained on a substrate surface. For example, an aluminum foil electrode substrate having a natural oxide film is obtained by chemically adsorbing a chlorosilane-based surface active material comprising a fluorocarbon chain to the substrate. It is possible in this invention to have a pre-treatment as follows in lieu of using the natural oxide layer: forming an electrolytic oxidated layer by electrolytic oxidation of the metallic film, or bonding a thin oxide layer such as $SiO_2$, $Al_2O_3$ being several hundred nanometers in thickness to the surface metallic film by spatter deposition, thus obtaining an excellent capacitor. A capacitor can be obtained by deposition of the aluminum layer on the surface bilayer laminated film. A thin film capacitor which has a high volume can be obtained comprising a thin (nanometer level), substantially pinhole-free dielectric film by using a siloxane-based monomolecular film having a fluorocarbon chain as the dielectric film.

14 Claims, 5 Drawing Sheets

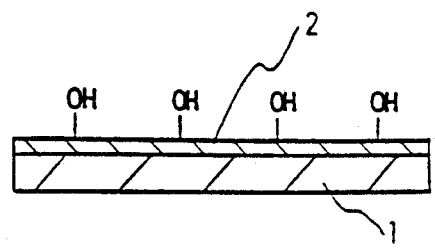
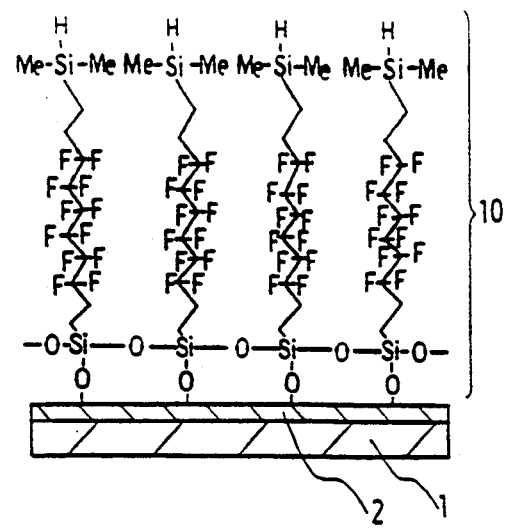
Figure-5(a)            Figure-5(b)
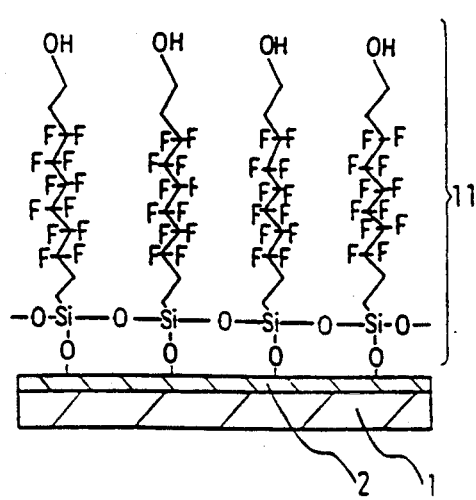
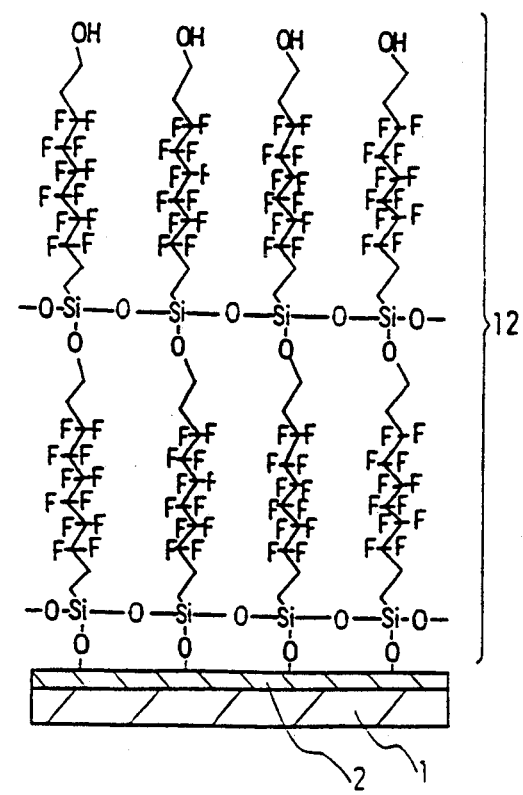
Figure-5(c)            Figure-5(d)

CAPACITOR AND METHOD OF MANUFACTURING THE SAME

FIELD OF THE INVENTION

The invention relates to a capacitor. More particularly, the invention relates a capacitor having a specific monomolecular film which is used as a dielectric film.

BACKGROUND OF THE INVENTION

A capacitor generally comprises an electrode substrate with a dielectric film, such as a resin film, and is manufactured as a multilayer capacitor or by rolling up the film. Recently, with miniaturizing electronic equipment, miniaturizing electronic parts has come to be in great demand. Materials and structure relating to the capacitors are aimed at miniaturizing and increasing the containing volume of a capacitor. For example, a metallic film capacitor is known as a means of miniaturizing and increasing the containing volume of a capacitor as mentioned above. A lacquer layer was obtained on both sides of the surface of a polyester film which was metalized by aluminum deposition. The lacquer layer thus obtained ws multilayered or rolled up, thus obtaining a metallic film capacitor. In the prior art mentioned above, the art of coating epoxy resins and the art of putting a polyester thin film into a thin layer electrode substrate are generally known. To miniaturize and increase the containing volume of a capacitor, it is very beneficial to make the dielectric film as thin as possible.

However, the prior art as mentioned above has the following problems; there is a limit to how thin a resin film can be made and the resin film is prone to form pin holes. In order to increase capacitance, a film coating can be thickened by the prior art methods mentioned above and sufficient mechanical strength of the film can be achieved but the film is prone to forming many pin holes and yield efficiency declines. Further the film is extremely deteriorated in resistance and voltage resistivity. When a pin hole id formed on a film, a new problem may occur. A short circuit may develop when a pin hole is generated and may lead to disaster.

SUMMARY OF THE INVENTION

An object of the invention is to provide a compact and effective capacitor having a thin layer to solve the problems of the existing method as mentioned above.

According to a first aspect of the invention we provide a capacitor comprising an electrode substrate and a siloxane-based chemically adsorbed dielectric film comprising a fluorocarbon chain, wherein the chemically adsorbed film is bonded through siloxane bonds to at least one surface of the electrode substrate.

It is preferable in this invention that the chemically adsorbed film is a monomolecular film or a polymer film.

In is preferable in this invention that the chemically adsorbed film is a laminated film containing a fluorocarbon chain and an inner layer of said laminated film is bonded by covalent —SiO— bonds to at least one surface of the electrode substrate.

It is preferable in this invention that the chemically adsorbed film is adsorbed to an inorganic oxide layer on the electrode substrate via siloxane bonds.

It is preferable in this invention that the inorganic oxide layer comprises at least one compound selected from the group consisting of $SiO_2$, $TiO_2$ and $Al_2O_3$.

It is preferable in this invention that the inorganic oxide film has a thickness of 1 to 100 nanometers.

It is preferable in this invention that the inorganic oxide film is formed by spattering and deposition.

It is preferable in this invention that the chemically adsorbed film is adsorbed to an electrolytically oxidized layer on the electrode substrate.

According to a second aspect of the invention we provide a method of manufacturing a capacitor comprising:

contacting a substrate surface with a non-aqueous solution containing a surface active material having fluorocarbon groups and chlorosilane groups, said substrate surface having active hydrogen groups;

removing unreacted surface active material remaining on the substrate by washing the substrate with non-aqueous organic solution to form an adsorbed monomolecular precursor film;

reacting unreacted chorosilane groups on the adsorbed monomolecular film with water after the removing step; and drying the adsorbed monomolecular film.

It is preferable in this invention that the surface active materials is $CF_3(CF_2)_n(R)_mSIX_pCl_{3-p}$ where n represents 0 or an integer, R represents an alkyl group, vinylene group, ethynylene group, or a substituted group containing a silicon atom, or an oxygen atom, m represent 0 or integer, X represents a hydrogen atom or a substituted group consisting of an alkyl group or an alkoxyl group, and p represents 0, 1 or 2.

It is preferable in this invention that the substrate surface is contacted with non-aqueous containing a multi-functional surface active material having chlorosilane groups, said substrate surface having hydrogen groups, thereby causing a chemical adsorption reaction to form a chemically adsorbed laminated film containing siloxane bonds on said inner layer.

It is preferable in this invention that the substrate surface is formed as an electrolytically oxidized layer by electrolytic oxidation.

It is preferable in this invention that an inorganic oxide layer comprising at least one compound selected from the group consisting of $SiO_2$, $TiO_2$ and $Al_2O_3$ is formed by spatter deposition.

According to a third aspect of the invention we provide a method of manufacturing a capacitor comprising:

contacting the substrate surface with a non-aqueous solution, said non-aqueous solution containing a surface active material having fluorocarbon and chlorosilane groups and said substrate surface having active hydrogen groups;

reacting a precursor polymer film on the substrate surface which contains a silanol group by reacting the chlorosilane groups with water; and drying said adsorbed polymer film.

To achieve the objects mentioned above, a capacitor is manufacture which comprises an electrode substrate and a siloxane-based monomolecular dielectric film comprising a fluorocarbon chain, wherein the monomolecular film is bonded via siloxane bonds to at least one surface of the electrode substrate.

According to the invention, a thin, dense and absolutely perfect dielectric film having a relative dielectric constant was formed on the surface of a thin electrode substrate easily. As the dielectric film was covalently bonded to the surface of the electrode substrate via a strong siloxane bond, an excellent, compact and effective capacitor which is moisture-proof and voltage proof can be provided at much lower cost.

As it is possible to add a chemical structure which enlarges the intramolecular dipole (for example, nematic crystalline liquid molecule, ferroelectric crystalline liquid molecule etc.,), to the dielectric film after formation by adsorption, the dielectric film can control the relative dielectric constant.

BRIEF DESCRIPTION OF THE DRAWINGS

FIGS. 5(a–d) is the drawing explaining the method of forming a fluorocarbon-based chemically absorbed monomolecular laminated film on the surface of a thin layer electrode substrate.

DETAILED DESCRIPTION OF THE INVENTION

Figure 1A:
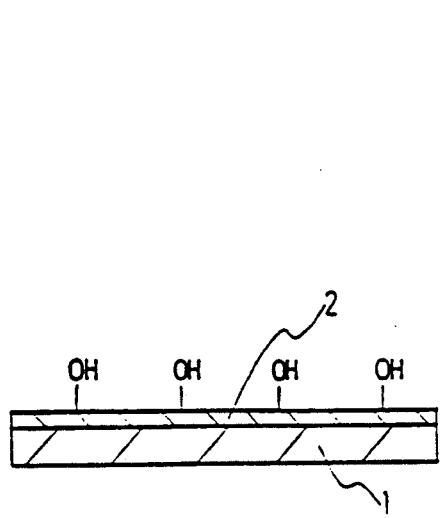
FIGS. 1(a–c) are drawings explaining the method of forming a fluorocarbon-based chemically adsorbed monomolecular laminated film on the surface of a thin layer electrode substrate.

According to the invention, a dielectric film is formed as a siloxane-based monomolecular film comprising a fluorocarbon chain. The monomolecular film, having excellent character as a dielectric film is a uniformly thin layer at the nanometer level and is also substantially pinhole-free. Further the monomolecular film is bonded to at least one surface of an electrode substrate via siloxane binds and is inseparable. The monomolecular film comprising the fluorocarbon chain is an excellent dielectric film, as it has water- and moisture proof properties by making use of the water-repelling property of fluorine.

Another object of the invention is to provide a substantially pinhole-free capacitor by making the dielectric film laminated.

The invention as mentioned above can provide a compact and effective capacitor, which has moisture- and voltage-proof properties at a lower cost. The capacitor comprises a dielectric film that is a chemically adsorbed fluorocarbon-based film.

The invention provides one or more layers of a substantially pinhole-free and voltage-proof monomolecular film on the surface of a thin layer of an electrode substrate by a chemical adsorption method which uses a fluorocarbon-based silicone surface active material as the dielectric film of a capacitor.

The monomolecular film is obtained by chemically adsorbing a chlorosilane-based surface active material in the form of a straight chain to the surface of a very thin electrode substrate in a non-aqueous organic solution.

The capacitor is manufactured by two steps:

(1) contacting a metallic thin electrode substrate layer with a non-aqueous solution, the non-aqueous solution containing a fluorocarbon-based surface active material comprising chlorosilyl groups on both sides of molecule and then reacting hydroxyl groups on the surface of the electrode with the chlorosilyl groups at one molecular end of said fluorocarbon-based surface active material, thus forming a chemical adsorbed monomolecular film on the surface electrode substrate, (2) washing to remove the unreacted surface active material remaining on surface electrode substrate with a non-aqueous solution and then reacting with water. Thus a monomolecular film comprising a surface active material having a plurality of silanol groups is obtained on the surface of the electrode substrate.

Further, in order to obtain a laminated film, by repeating the steps as mentioned above more than once, a fluorocarbon-based chemically adsorbed laminated molecular film is obtained.

It is preferable in the invention that the fluorocarbon-based surface active material which comprises chlorosilyl groups on both sides of the molecule is $X_pCl_{3-p}Si-R^1-(CF_2)_n-R^2-SiX_qCl_{3-q}$ where n represent 0 or an integer, $R^1$, $R^2$ represents alkylene groups or substituted groups containing a silicon atom, or an oxygen atom, X represents a substituted group containing an alkylene group or H, and p, q represents 0, 1 or 2.

A capacitor is manufactured by two steps:

(1) in laminating the fluorocarbon-based chemically adsorbed monomolecular film, a metallic tin electrode substrate layer is contacted with a non-aqueous solution, the non-aqueous solution contains chlorosilyl groups at one molecular end and functional groups at another molecular end, and then the hydroxyl groups on the surface of the substrate are reacted with chlorosilyl groups at one molecular end of the surface active material, thus forming a chemical adsorbed monomolecular film on the surface electrode substrate, and (2) the unreacted surface active material remaining on the surface of the electrode substrate is removed by washing with a non-aqueous solution.

A fluorocarbon-based laminated monomolecular film is obtained by repeating the above steps as follows: the monomolecular film on the substrate surface is treated with a chemical agent or plasma in an active atmosphere or irradiated with an energy beam and thus reactive functional groups are converted to active chlorosilyl groups.

It is preferable in the invention that $R^1R^2(CF_2)_n-R_3-SiX_pCl_{3-p}$ (where n represents 0 or an integer, $R^1$ represents non-saturation groups or dimethylsilyl groups, $R^2$, and $R^3$ represent substituted groups containing a silicon atom or an oxygen atom or alkylene groups, X represents H or a substituted group such as an alkylene group, p represents 0 or 1 or 2) is used as a surface active material containing a plurality of chlorosilyl groups at one molecular end and containing reactive functional groups at another molecular end.

The invention provides a monomolecular film or laminated monomolecular film by chemically adsorbing a chlorosilane-based surface active material comprising a fluorocarbon chain in the form of a straight chain as a dielectric film for a capacitor.

The chemically adsorbed material to be used in laminating teh fluorocarbon-based chemically adsorbed monomolecular film used as a dielectric film for a capacitor in the invention, and the prior art of laminating a monomolecular film will be described as follows:

In forming a fluorocarbon-based laminated monomolecular film, it is possible to use a chlorosilane-based surface active material having a straight chain inner fluorocarbon chain and which comprises chlorosilane groups ($SiCl_nX_{3-n}$ groups, n=1, 2, or 3, X represents function group) at both molecular ends. Particularly, it is preferable in the invention that $X_pCl_{3-p}Si-R^1-(CF_2)_n-R_2-SiX_qCl_{3-q}$ (where n represents 0 or an integer, $R^1$, and $R^2$ represent substituted groups containing a silicon atom or an oxygen atom or alkylene groups, X represents H or a substituted group such as an alkylene group, p and q represent 0 or 1 or 2) or $CF_3-(CF_2)_n-R-SiX_qCl_{3-q}$ (where n represents 0 or an integer, R represents a substituted group containing a silicon atom or an oxygen atom, X represents H or a substituted group such as an alkylene group, q represents 0 or 1 or 2) is used as a surface active material containing a plurality of chlorosilyl groups at both molecular ends.

In laminating other fluorocarbon-based chemically adsorbed monomolecular films, it is possible to use a chlorosilane-based active material having a straight chain inner fluorocarbon chain and containing chlorosilane groups i.e., a ($SiCl_nX_{3-n}$ group, n=1, 2, or 3, X represents a functional group) at one molecular end and containing a reactive functional group at another molecular end. Particularly, it is preferable to use $R^1-R^2-(CF_2)_n-R^3-SiX_pCl_{3-p}$ (where n represents 0 or an integer, $R^1$ represents a non-saturated group such as a vinyl group or acetylene group or dimethlylsilyl, $R^2$ and $R^3$, represent substituted groups containing a silicon atom or an oxygen atom or alkylene groups, X represents H or a substituted group such as an alkylene group, p represents 0 or 1 or 2). Embodiments of the invention will be described using a surface active material as follows.

$Cl_3Si-(CH_2)_2-(CF_2)_6-(CH_2)_2-SiCl_3$,
$CF_3-(CF_2)_7-(CH_2)_2-SiCl_3$,
$CH_2=CH-(CF_2)_6-(CH_2)_2-SiCl_3$, and

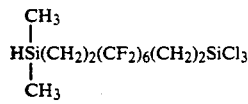

EXAMPLE 1

Figure 1B:
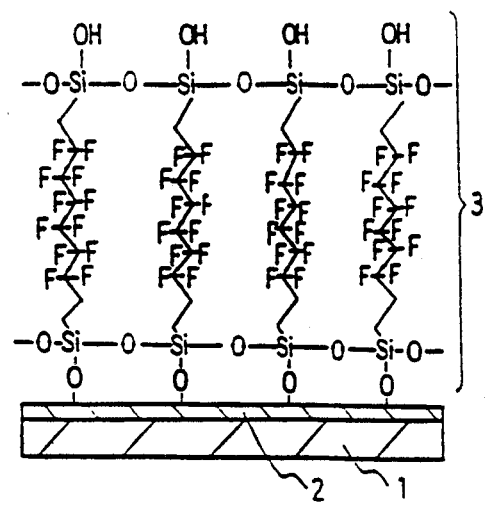

As seen in FIG. 1(b) a dielectric film 3 made of a monomolecular film or a laminated monomolecular film containing chlorosilane-based surface active material is obtained by chemically adsorbing a chlorosilane-based adsorbing material via a natural oxide layer to a roller material film, to a thin electrode substrate which forms a capacitor. The substrate can be an aluminum foil and may contain Sn, Cu or stainless steel or an alloy containing Sn, Cu, or stainless steel. It is possible in the invention to have a pre-treatment as follows in lieu of using a natural oxide layer:
- forming an electrolytically oxidized layer by electrolytic oxidation of the metallic film,
- bonding a thin oxide layer such as $SiO_2$, $Al_2O_3$ (being several hundred nanometers in thickness to the metallic film surface by spatter deposition, thus obtaining an excellent capacitor.

The chemically adsorbing condition mentioned above is described as follows:

A hydrophilic thin layer metallic electrode substrate was dipped and held in a prepared solution of 80% by weight of hexadecane (toluene, xylene, or bicyclohexane is available), 12% by weight of carbon tetrachloride, 8% by weight of chloroform and containing 2% by weight of $Cl_3Si(CH_2)_2(CF_2)_6(CH_2)_2SiCl_3$ as the chlorosilyl-based surface active material containing a plurality of chlorosilyl groups at both molecular ends for about two hours after drying (FIG. 1(a)). Since a natural oxide film was formed on the surface of the electrode substrate and contained numerous hydroxyl groups 2, a dehydrochlorination reaction between the chlorosilyl groups of the chlorosilyl-based surface active material and the hydroxyl groups formed covalent bonds on the surface electrode substrate. This reaction is represented in the following formula [1].

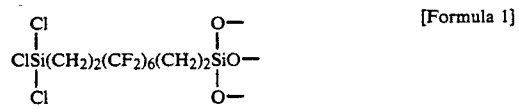

[Formula 1]

The substrate was then washed with an organic solution to remove the unreacted surface active material remaining on the surface electrode substrate, followed by washing with water. The siloxane-based monomolecular film as in formula [2] had about a 1.5 nanometer thickness and was chemically bonded to the surface of the aluminum foil (FIG. 1(b)).

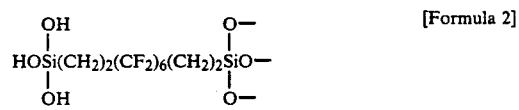

[Formula 2]

Figure 1C:
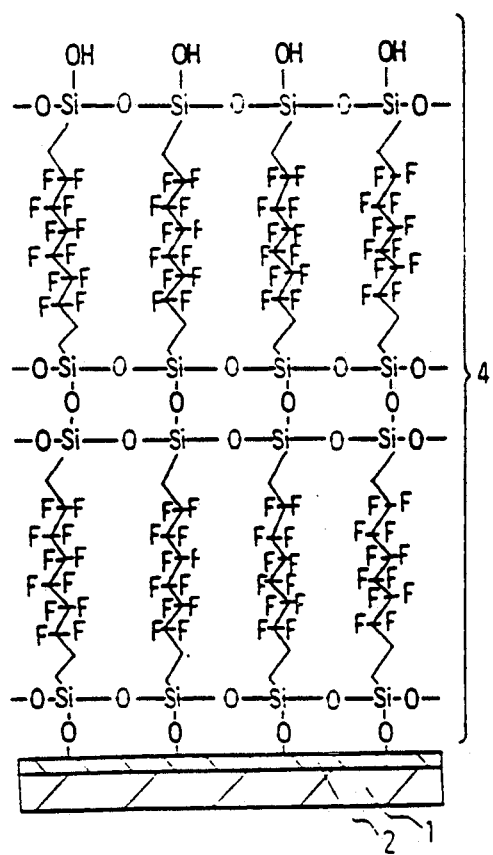

Then a two-layer molecular laminated film 4 as shown in FIG. 1 (c) was obtained by repeating the chemical adsorbing step and the washing with water step. A capacitor was manufactured by deposition of an aluminum layer having a 2.5 nm thickness on the surface bilayer (two-layer molecular laminated) film 4 obtained by the steps mentioned above.

A substantially pinhole-free, extremely adherent fluorocarbon-based chemically adsorbed monomolecular film was obtained by repeating the chemical adsorbing step and the washing with water step for the two-layer molecular laminated film 4.

EXAMPLE 2

The bilayer laminated molecular film comprising numerous hydroxyl groups, which was formed on the surface of the electrode substrate in Example 1, was dipped and held in a prepared solution of 80% by weight of hexadecane (toluene, xylene, or bicyclohexane is available), 12% by weight of carbon tetrachloride, 8% by weight of chloroform and containing 2% by weight of $CF_3(CF_2)_7(CH_2))_2SiCl_3$ as the chlorosilyl-based surface active material containing a plurality of chlorosilyl groups at one molecular end and containing substituted groups and a fluorocarbon group at the other molecular end, for about two hours. Since the laminated surface film contained numerous hydroxyl groups, a dehydrochlorination reaction between the chlorosilyl groups of the chlorosilyl-based surface active material and the hydroxyl groups formed covalent bonds on the surface electrode substrate. This reaction is represented in the following formula [3].

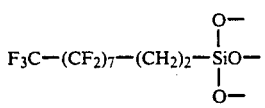   [Formula 3]

Figure 2:
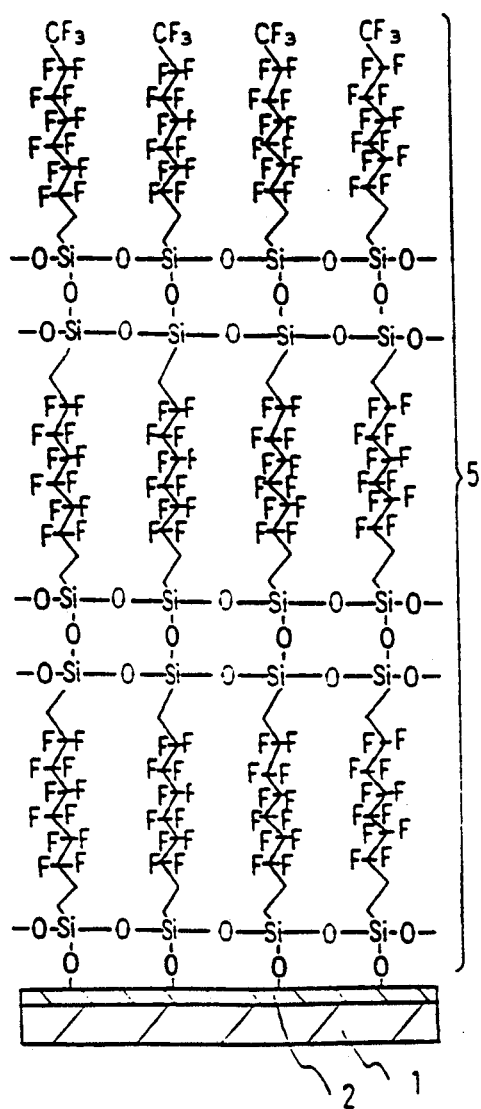
FIG. 2 is a drawing explaining the method of forming a fluorocarbon-based chemically adsorbed monomolecular laminated film on the surface of a thin layer electrode substrate.

The substrate was then washed with an organic solution to remove the unreacted surface active material remaining on the surface electrode substrate. Thus an extremely adherent fluorocarbon-based chemically adsorbed monomolecular film 5, its surface being covered with fluorocarbon groups, was obtained as seen in FIG. 2. An excellent capacitor was formed which has a relatively large volume and voltage resistivity, as seen in Embodiment 1, by using an electrode substrate which was formed on the laminated film mentioned above.

In Examples 1 and 2, $Cl_3Si(CH_2)_2(CF_2)_6(CH_2)SiCl_3$ and $F_3C(CF_2)_7(CH_2)_2SiCl_3$ are used. Other available chemical adsorbed materials are as follows:

$Cl_3Si(CH_2)_2(CF_2)_8(CH_2)SiCl_3$,
$Cl(CH_3)_2Si(CH_2)_2(CF_2)_6(CH_2)SiCl_3$,
$Cl(CH_3)_2Si(CH_2)_2(CF_2)_8(CH_2)SiCl_3$,

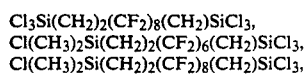

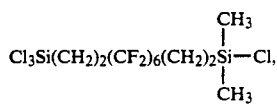

$F_3C(CF_2)_9(CH_2)_2SiCl_3$,
$F_3C(CF_2)_5(CH_2)_2SiCl_3$,
$CF_3CH_2O(CH_2)_{15}SiCl_3$,

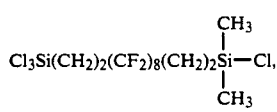

$CF_3COO(CH_2)_{15}SiCl_3$, etc.

EXAMPLE 3

Figure 3:
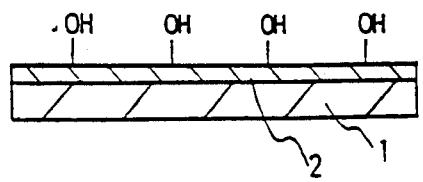
FIGS. 3(a–d) is a drawing explaining the method of forming a fluorocarbon-based chemically adsorbed monomolecular laminated film on the surface of a thin layer electrode substrate.
Figure 3:
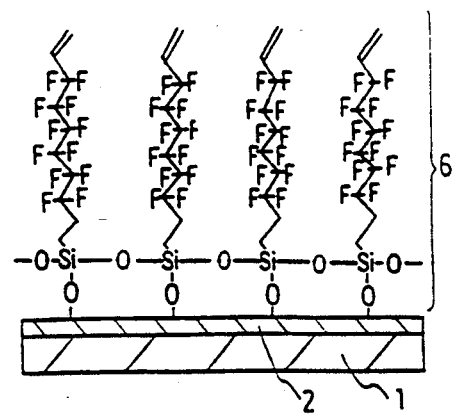
Figure 3:
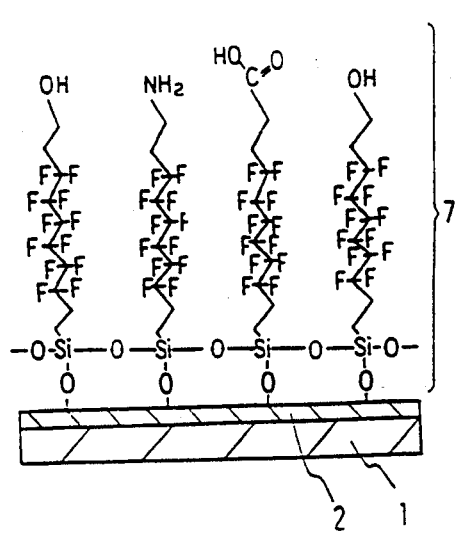
Figure 3:
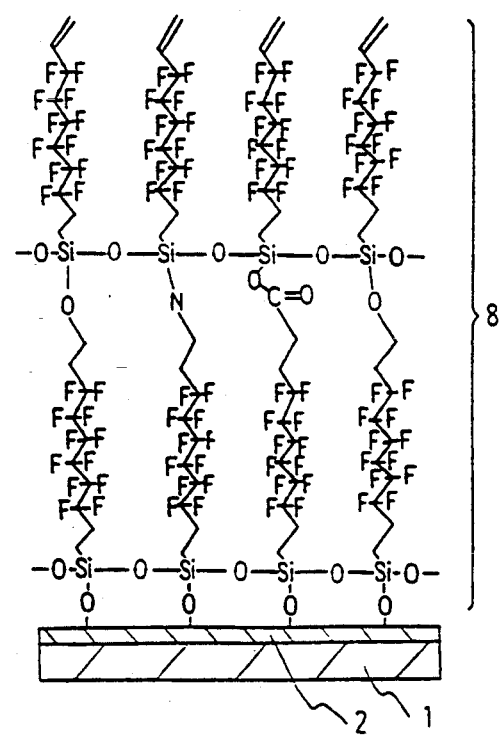

The thin electrode substrate layer, as shown in FIG. 3 (a), was dipped and held in a prepared solution of 80% by weight of hexadecane (toluene, xylene, bicyclohexane is available.), 12% by weight of carbon tetrachloride, 8% by weight of chloroform and containing 2% by weight of $CH_2=CH-(CF_2)_6-(CH_2)_2-SiCl_3$ as the chlorosilyl-based surface active material containing a plurality of chlorosilyl groups at one molecular end and containing vinyl groups at another molecular end for about two hours after drying. Since the surface of the electrode substrate contained numerous hydroxyl groups, a dehydrochlorination reaction between the chlorosilyl groups of the chlorosilyl-based surface active material and the hydroxyl groups formed the monomolecular film 6 on the entire electrode substrate surface. The reaction is represented in the following formula [4] (FIG. 3(b)).

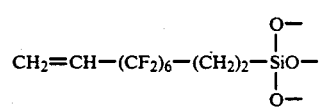   [Formula 4]

The substrate was then washed with an organic solution to remove the unreacted surface active material remaining on the surface electrode substrate, and was irradiated with an energy beam (such as an electron beam, an ionic beam, gamma rays, ultraviolet rays) (for example, irradiating with an electron beam of about 5 Mrads in air). Thus the monomolecular film 7 comprising molecules shown in formula [5] to [7] was chemically bonded to the surface of the electrode substrate as shown in FIG. 3(c).

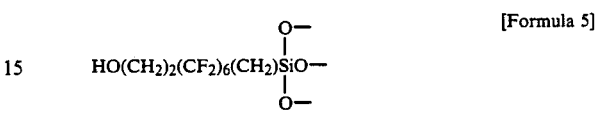   [Formula 5]

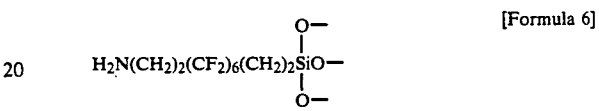   [Formula 6]

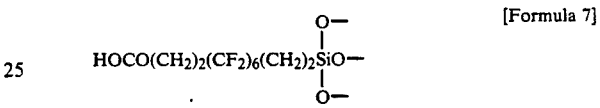   [Formula 7]

A two-layer molecular film 8 comprising fluorocarbon groups as shown in FIG. 3(d) was formed by repeating the chemical adsorbing step and the washing with water step once more using $CH_2=CH-(CF_2)_6-(CH_2)_2-SiCl_3$.

An adherent chemically adsorbed monomolecular film, its surface covered with hydrophilic groups, for example, hydroxyl groups, carboxyl groups, imino groups, or amino groups etc., was obtained by repeating the chemically adsorbing step and irradiating with an energy beam step.

An excellent capacitor containing a relatively large volume and having increased voltage resistivity, as seen in Example 1, was obtained by using an electrode substrate which was formed on the laminated film mentioned above.

EXAMPLE 4

The electrode substrate, on whose surface the monomolecular film was obtained in Example 3, was dipped and held in a prepared solution of 80% by weight of hexadecane (toluene, xylene, bicyclohexane is available.), 12% by weight of carbon tetrachloride, 8% by weight of chloroform and containing 2% by weight of $F_3C-(CF_2)_7-(CH_2)_2-SiCl_3$ as the chlorosilyl-based surface active material containing a plurality of chlorosilyl groups at one molecular end and containing substituted groups containing trifluorocarbon at another molecular end for about two hours. Since the surface of the laminated film contained numerous hydroxyl groups and imino groups, a dehydrochlorination reaction between the chlorosilyl groups of the chlorosilyl-based surface active material and the hydroxyl groups formed covalent bonds on the surface of the electrode substrate. This reaction is represented in the following formula [8]. Thus the bonds as shown in formula [8] were formed on the entire surface of the electrode substrate.

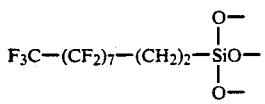

[Formula 8]

Figure 4:
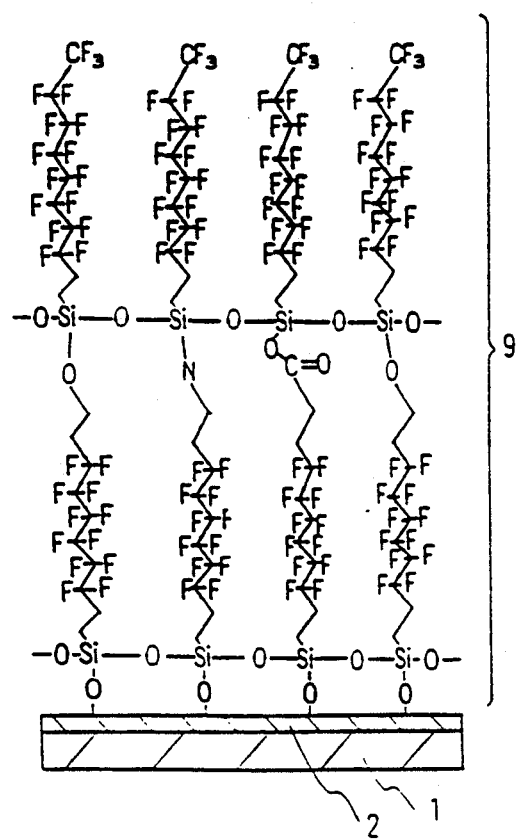
FIG. 4 is a drawing explaining the method of forming a fluorocarbon-based chemically adsorbed monomolecular laminated film on the surface of a thin layer electrode substrate.

The substrate was then washed with an organic solution to remove the unreacted surface active material remaining on the surface of the electrode substrate. An extremely adherent fluorocarbon-based chemically absorbed monomolecular film, its surface being covered with fluorocarbon groups as shown in FIG. 4 was formed.

An excelent capacitor containing a relatively large volume and having increased voltage resistivity as seen in Embodiment 1 was obtained by using an electrode substrate which was formed on the laminated film mentioned above. In the Example,
$CH_2=CH-(CF_2)_6-(CH_2)_2-SiCl$ or
$F_3C-(CF_2)_7-(CH_2)_2-SiCl_3$ and
$CH_2=CH-(CF_2)_6-(CH_2)_2-SiCl_3$,
$F_3C-(CF_2)_9-(CH_2)_2-SiCl_3$,
$F_3C-(CF_2)_5-(CH_2)_5-(CH_2)_2-SiCl_3$,
$CF_3CH_2O(CH_2)_{15}-SiCl_3$,
$CF_3(CH_2)_2Si(CH_3)_2(CH_2)_{15}SiCl_3$,
$F(CF_2)_4(CH_2)_2Si(CH_3)_2(CH_2)_9SiCl_3$,
$CF_3COO(CH_2)_{15}-SiCl_3$ was available.

EXAMPLE 5

A thin film electrode substrate (FIG. 5 (a)) was dipped and held in a prepared solution of 80% by weight of hexadecane (toluene, xylene, bicyclohexane is available.), 12% by weight of carbon tetrachloride, 8% by weight of chloroform and containing 2% by weight of $HSi(CH_3)_2(CH_2)_2(CF_2)_6(CH_2)_2SiCl_3$ as the chlorosilyl-based surface active material containing a plurality of chlorosilyl groups at one molecular end and containing dimethlysilyl groups at another molecular end for about two hours after drying. Since the surface of hydrophilic electrode substrate contained numerous hydroxyl groups, a dehydrochlorination reaction between the chlorosilyl groups of the chlorosilyl-based surface active material and the hydroxyl groups formed covalent bonds on the surface electrode substrate, thus forming a monomolecular film 10 represented in the following formula [9].

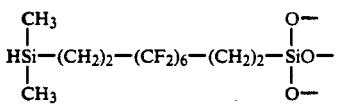

[Formula 9]

The substrate was then washed with an organic solution to remove the unreacted surface active material remaining on the surface of the electrode substrate, followed by treating with a $H_2O_2$ solution containing KF, KHCO$_3$, MeOH and THF. The monomolecular film 11 was formed on the surface of the electrode substrate via covalent bonds represented in the following formula [10] (FIG. 5 (c)).

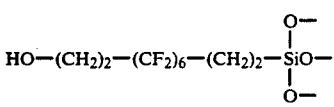

[Formula 10]

A two-layer molecular film 12 comprising fluorocarbon groups shown in FIG. 5 (d) was obtained by repeating the chemical absorbing step using $HSi(CH_3)_2(CH_2)_2(CF_2)_6(CH_2)_2SiCl_3$ and the $H_2O_2$ treating step was repeated (twice).

A hydrophilic oil-repelling and very adherent fluorocarabonbased chemically absorbed monomolecular film was formed. Its surface was covered with hydroxyl groups and was formed by repeating the chemical adsorbing step and $H_2O_2$ treating step.

An excellent capacitor containing a relatively large volume and having increased voltage resistivity, as seen in Example 1, was obtained by forming an electrode substrate on the surface of the laminated film.

EXAMPLE 6

An aluminum layer being about 100 nanometers in thickness was formed on a poly(ethylene terephthalate) film substrate (thickness:1 μm) by spatter deposition. Next, the aluminum layer was oxidized in air and a natural oxide film ($Al_2O_3$) was formed on the aluminum surface. Subsequently, the substrate was dipped and held in water and was dried. The aluminum natural oxide film ($Al_2O_3$) contained hydroxyl groups (-OH). The aluminum electrode substrate was then dipped and held in a surface active material solution which was prepared by dissolving octadecyltrichlorosilane (manufactured by Shin-etsu Kagaku Kogyo Co., Ltd.) and heptafluoroethyl-trichlorosilane (manufactured by Toshiba Silicon Co., Ltd.) together in a mole ratio of 1:1.

1 millimol/liter of the solution was then added to a non-aqueous freon-113 solution and placed in dry glove bag which was held at a relative humidity of 10% using dry nitrogen gas, followed by washing away unreacted surface active materials with freon-113, followed by washing with water or exposing to air containing moisture and dried. A chemically adsorbed film having the surface active materials octadecylsilane and heptafluoroethylsilane was thus formed on the aluminum electrode substrate via siloxane bonds. It had a thickness corresponding to the molecular length of the surface active materials used (i.e., about 2.5 nm). The relative dielectric constant of the capacitor was 7.7 (the relative dielectric constant is equal to 1 in a vacuum condition.) The electrode substrate was 2 mm×5 mm and contained 1 KH$_2$ and measured 20–30 nanofarad (nF). The capacitor could withstand 5 V.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A capacitor comprising an electrode substrate and a siloxane-based chemically absorbed dielectric film comprising a fluorocarbon chain, wherein said chemically adsorbed film is bonded through siloxane bonds to at least one surface of the electrode substrate.

2. The capacitor according to claim 1, wherein said chemically adsorbed film is a monomolecular film or a polymer film.

3. The capacitor according to claim 1 or 2, wherein said chemically adsorbed film is a laminated film containing a fluorocarbon chain and an inner layer of said laminated film is bonded by covalent —SiO— bonds to at least one surface of the electrode substrate.

4. The capacitor according to claim 1, wherein said chemically adsorbed film is adsorbed to an inorganic oxide layer on said electrode substrate via siloxane bonds.

5. The capacitor according to claim 4, wherein said inorganic oxide layer comprises at least one compound selected from the group consisting of $SiO_2$, $TiO_2$ and $Al_2O_3$.

6. The capacitor according to claim 4, wherein said inorganic oxide film has a thickness of 1 to 100 nanometers.

7. The capacitor according to claim 4, wherein said inorganic oxide film is formed by spattering or deposition.

8. The capacitor according to claim 1, wherein said chemically adsorbed film is adsorbed to an electrolytically oxidized layer on said electrode substrate.

9. A method of manufacturing a capacitor comprising:
contacting a substrate surface with a non-aqueous solution containing a surface active material having fluorocarbon groups and chlorosilane groups, said substrate surface having active hydrogen groups;
removing unreacted surface active material remaining on the substrate by washing the substrate with a non-aqueous organic solution to form an adsorbed monomolecular precursor film;
reacting unreacted chlorosilane groups on the adsorbed monomolecular precursor film with water after the removing step; and
drying the adsorbed monomolecular film.

10. The method of manufacturing a capacitor according to claim 9, wherein said surface active material is $CF_3(CF_2)_n(R)_mSiX_pCl_{3-p}$ where n represents 0 or an integer, R represents an alkyl group, vinylene group, ethynylene group, or a substituted group containing a silicon atom, or an oxygen atom, m represents 0 or integer, X represents a hydrogen atom or a substituted group consisting of an alkyl group or an alkoxyl group, and p represents 0, 1 or 2.

11. The method of manufacturing a capacitor according to claim 9, wherein said substrate surface is contacted with an inner layer of a non-aqueous solution containing a multi-functional surface active material having chlorosilane groups, said substrate surface having active hydrogen groups, thereby causing a chemical adsorption reaction to form a chemically adsorbed laminated film containing siloxane bonds on said inner layer.

12. The method of manufacturing a capacitor according to claim 9, wherein said substrate surface is formed an electrolytic oxidated layer by electrolytic oxidation.

13. The method of manufacturing a capacitor according to claim 9, wherein an inorganic oxide layer comprising at least one compound selected from the group consisting of $SiO_2$, $TiO_2$ and $Al_2O_3$ is formed by spatter deposition.

14. A method of manufacturing a capacitor comprising:
contacting the substrate surface with a non-aqueous solution, said non-aqueous solution containing a surface active material having fluorine groups and chlorosilane groups and said substrate surface having active hydrogen groups;
reacting a precursor polymer film on the substrate surface which contains a silanol group by reacting the chlorosilane groups with water; and
drying said adsorbed polymer film.

* * * * *